(12) United States Patent
Subler et al.

(10) Patent No.: US 6,177,744 B1
(45) Date of Patent: *Jan. 23, 2001

(54) SEAL ARRANGEMENT FOR AN ELECTRIC MOTOR

(75) Inventors: William L. Subler, Kings Mountain; Harvey A. Trickel; T. Wayne Paschall, both of Gastonia, all of NC (US)

(73) Assignee: Reliance Electric Technologies, LLC, Thousand Oaks, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/042,822

(22) Filed: Mar. 17, 1998

(51) Int. Cl.⁷ .............................. H02K 5/16; F16C 19/00; F16C 33/76
(52) U.S. Cl. .......................... 310/90; 384/471; 384/479; 384/486
(58) Field of Search ................. 310/90, 90.5; 384/91, 384/93, 94, 140, 141, 143, 147, 148, 225, 218, 468, 471, 479, 480, 484, 485, 486, 465, 472, 130, 477

(56) References Cited

U.S. PATENT DOCUMENTS

| | | | |
|---|---|---|---|
| 3,572,732 | * | 3/1971 | Sekulich ............................ 277/153 |
| 3,603,655 | * | 9/1971 | Keller et al. ....................... 384/459 |
| 3,614,183 | * | 10/1971 | Berens et al. ..................... 384/486 |
| 3,658,395 | * | 4/1972 | Hallerback ........................ 384/484 |
| 3,679,277 | * | 7/1972 | Dohmen ............................ 384/480 |
| 3,685,838 | * | 8/1972 | Malmstrom ....................... 277/560 |
| 3,685,841 | * | 8/1972 | Keller ................................. 277/37 |
| 3,741,615 | * | 6/1973 | Otto .................................. 384/486 |
| 3,841,723 | * | 10/1974 | Kelso ................................ 384/486 |
| 3,856,368 | * | 12/1974 | Andersen .......................... 384/485 |
| 3,858,950 | * | 1/1975 | Otto ................................ 308/187.1 |
| 3,982,864 | * | 9/1976 | Cain .................................. 418/149 |
| 4,399,998 | * | 8/1983 | Otto .................................. 277/134 |
| 4,848,776 | * | 7/1989 | Winckler ........................... 277/23 |
| 4,856,235 | * | 8/1989 | Haynie ............................. 51/289 R |
| 5,185,544 | * | 2/1993 | Takada ............................... 310/58 |
| 5,368,397 | * | 11/1994 | Freiwald ........................... 384/130 |
| 5,370,404 | * | 12/1994 | Klein et al. ........................ 277/37 |
| 5,697,710 | * | 12/1997 | Iida et al. .......................... 384/473 |
| 5,753,986 | * | 5/1998 | Ohtani ............................... 310/56 |

* cited by examiner

Primary Examiner—Nestor Ramirez
Assistant Examiner—Dang Dinh Le
(74) Attorney, Agent, or Firm—Patrick S. Yoder; John J. Horn; A. M. Gerasimow

(57) ABSTRACT

A technique is provided for sealing a bearing cavity in a rotating machine such as an electric motor. The bearing cavity is defined by annular elements on either side of an antifriction bearing set. Seals are provided on the sides of the bearing cavity and are secured to a support structure, such as the motor housing, and include elements which ride against the rotating shaft during operation. The seals exert a sealing force against the rotating element which results at least partially from internal pressure within the bearing cavity provided by a pressurized lubricant stream. The lubricant stream is provided in the form of an airborne oil mist.

15 Claims, 4 Drawing Sheets

SEAL ARRANGEMENT FOR AN ELECTRIC MOTOR

BACKGROUND OF THE INVENTION

1. Field of the Invention

The present invention relates generally to the field of electric motors and seals for such motors. More particularly, the invention relates to a novel arrangement for maintaining lubricant, such as oil mist, within a bearing cavity to supply continuous lubrication to rotor bearings during operation of the motor, and for enhancing sealing of regions within which the rotor bearings are disposed.

2. Description of the Related Art

A wide variety of electric motors are available and are currently in use throughout a range of industrial applications. In general, such motors include a stator provided in a motor housing, and a rotor surrounded at least partially by the stator and supported for rotation within the housing. The stator and rotor may be mechanically and electrically configured in various manners, depending upon the application, the power available to drive the motor, and so forth. In general, however, electric power is applied to the stator and the rotor is thereby driven in rotation to produce rotary motion and transmit mechanical power via an output shaft which may be coupled to a driven load.

In conventional electric motors the rotor and output shaft are most often supported by anti-friction bearings on either end of the motor housing. Depending upon the size of the motor and the anticipated loading, the rotor and shaft support bearings may be journal bearings, needle bearings, roller bearings, ball bearings, and so forth. To prolong the useful life of the rotor bearings, it is commonplace to equip the motor with a means for lubricating the bearing elements during operation. For example, the bearings may be provided with a synthetic or mineral grease or oil which coats surfaces of the bearing elements and which may preclude the ingress of contaminants, such as dirt, debris, moisture, and so forth into the bearing. In other applications, a pressurized oil mist may be circulated through a bearing cavity to provide continuous lubrication of the bearing and to similarly prevent the ingress of contaminants, while flushing the bearing cavity of contaminants and moisture.

A difficulty which arises in oil mist-lubricated motor bearings involves the escape of oil mist into the motor housing and outwardly into the atmosphere surrounding the motor. In particular, in totally-enclosed, fan-cooled motors, a negative pressure may be created within the motor housing due to the circulation of air through the housing under the influence of a fan mounted on the rotor shaft. In many applications no seal is used to retain the oil mist within the bearing cavity. Even where seals are employed these are typically provided for preventing the ingress of contaminants and moisture into the bearing cavity, often inadvertently facilitating the conveyance of oil mist from the bearing cavity into the motor enclosure.

Other difficulties in sealing anti-friction bearings installed on electric motor shafts arise from the relative speeds between the sealing elements and the rotating elements, typically the shaft itself. In particular, while certain sealing arrangements may be employed to isolate inner bearing cavities from ambient air and from the inner volume of the electric motor housings, the use of such seals is typically limited by the relative surface velocity of the rotating and non-rotating elements. In particular, seals designed to ride on rotating shafts or other rotating elements secured to the shafts may require certain relative velocities in order to maintain an adequate seal. In certain applications, the motor shaft must be increased in size to provide sufficient velocity to maintain the desired seal, despite the fact that the oversized dimensions of the shaft are not necessary for transmitting anticipated torque levels. However, where such velocities become excessive, the seal life may be significantly reduced due to heating caused by friction between the seal and the rotating member. Moreover, depending upon the motor design and its rated speed, the same sealing arrangements may not be applicable due to the increased speed of the motor (e.g., two-pole speeds of 3600 rpm in 60 Hertz electrical supply systems).

There is a need, therefore, for an improved technique for providing a seal adjacent to a motor bearing which is effective at maintaining an oil mist or similar lubricant within the environment of the bearing, while also inhibiting the ingress of contamination and moisture into the vicinity of the bearing. In particular, there is a need for a sealing technique for motor bearings which can be both installed on new motors as well as retrofitted on existing motors in which such lubricant systems are employed. There is also a particular need for a sealing technique for motor bearings which provides an enhanced sealing capability despite the particular speed of the rotor shaft, and that avoids or reduces the tendency of the shaft seal to overheat due to high relative surface speeds during operation.

SUMMARY OF THE INVENTION

The invention provides a novel technique for sealing a lubricant within a region of an electric motor designed to respond to these needs. The invention is particularly well suited for use in motors, such as totally-enclosed, fan-cooled motors, wherein an air-born lubricant in the vicinity of a bearing may be drawn or sucked into the motor enclosure during operation. The technique employs seals which may be retrofitted to existing motors to enhance their performance, or which may be designed into new machines. The seals may have a relaxed fit about the rotor shaft as compared to existing shaft seals, reducing the tendency to wear either the shaft or the seal during operation. The sealing force exerted by the seal is enhanced by the pressure of the lubricant system, providing improved sealing, even at a range of shaft speeds.

Thus, in accordance with a first aspect of the invention, a seal assembly is provided for isolating a rotor bearing lubricated by a pressurized lubricating medium. The seal assembly isolates the bearing from an ambient region. The rotor bearing is disposed between a stationary member and a rotating member. The pressurized lubricating medium is provided to the bearing at a first pressure higher than a second pressure in the ambient region. The seal assembly includes a support portion and a riding portion. The support portion is adapted to be secured to the stationary member. The riding portion extends from the support portion towards the bearing. The riding portion is configured to ride against the rotating member during rotation of the rotating member and to apply sealing force against the rotating member. The riding portion includes a pressure application region configured to be exposed to the first pressure during operation. The sealing force is produced at least partially by application of the first pressure against the pressure application region. The sealing force is thus enhanced by the pressure of the lubricating medium. In accordance with a particularly preferred configuration, the lubricating medium continuously flows through the cavity in which the bearing is supported.

In accordance with another aspect of the invention, a seal arrangement is provided for an electric motor bearing.

Electric motor includes a stationary housing and a rotor rotatably supported within the housing by the bearing. The bearing is disposed in a bearing cavity defined at least partially by the housing and the rotor. The housing includes a fluid path for continuously circulating a lubricant through the bearing cavity at an internal pressure higher than ambient pressure. The seal arrangement includes first and second seals disposed about the rotor shaft. The first seal has a first support portion and a first riding portion. The first support portion is supported in the housing and the first riding portion extends from the first support portion to contact a first region of the rotor. The first riding portion thus exerts a sealing force against a first region to seal the bearing cavity. The second seal has a second support portion and a second riding portion. The second support portion is supported in the housing and a second riding portion extends from the second support portion to contact the second region of the rotor. The second riding portion thus exerts a sealing force against the second region to seal the bearing cavity. In operation the first and second riding portions are at least partially exposed to the internal pressure. The sealing force exerted by the first and second riding portions is at least partially produced by internal pressure on the riding portions. The bearing cavity is thus sealed by the first and second seals, and sealing forces exerted by the seals are enhanced by the internal pressure of the continuously circulating lubricant.

The invention also provides a method for sealing a bearing cavity formed by a support structure and a rotating member. The support structure and rotating member may advantageously be defined by the frame of an electric motor and a rotating rotor or shaft within the frame. In accordance with the method, a first seal is provided on a first side of the bearing cavity. The first seal extends between the support structure and the rotating member to seal the first side of the bearing cavity, while allowing relative motion of the rotating member with respect to the support structure. A flow of pressurized fluid is directed into the bearing cavity to urge the first seal into a sealing position. In accordance with a particularly preferred embodiment of the method, a second seal is provided on a second side of the bearing cavity. The second seal extends between the support structure and the rotating member to seal the second side of the bearing cavity. The flow of pressurized fluid will also urge the second seal into a sealing position. The flow of pressurized fluid advantageously includes a air stream at a higher than ambient pressure and a lubricant carried by the air stream.

BRIEF DESCRIPTION OF THE DRAWINGS

The foregoing and other advantages and features of the invention will become apparent upon reading the following detailed description and upon reference to the drawings in which.

DETAILED DESCRIPTION OF SPECIFIC EMBODIMENTS

Figure 1:
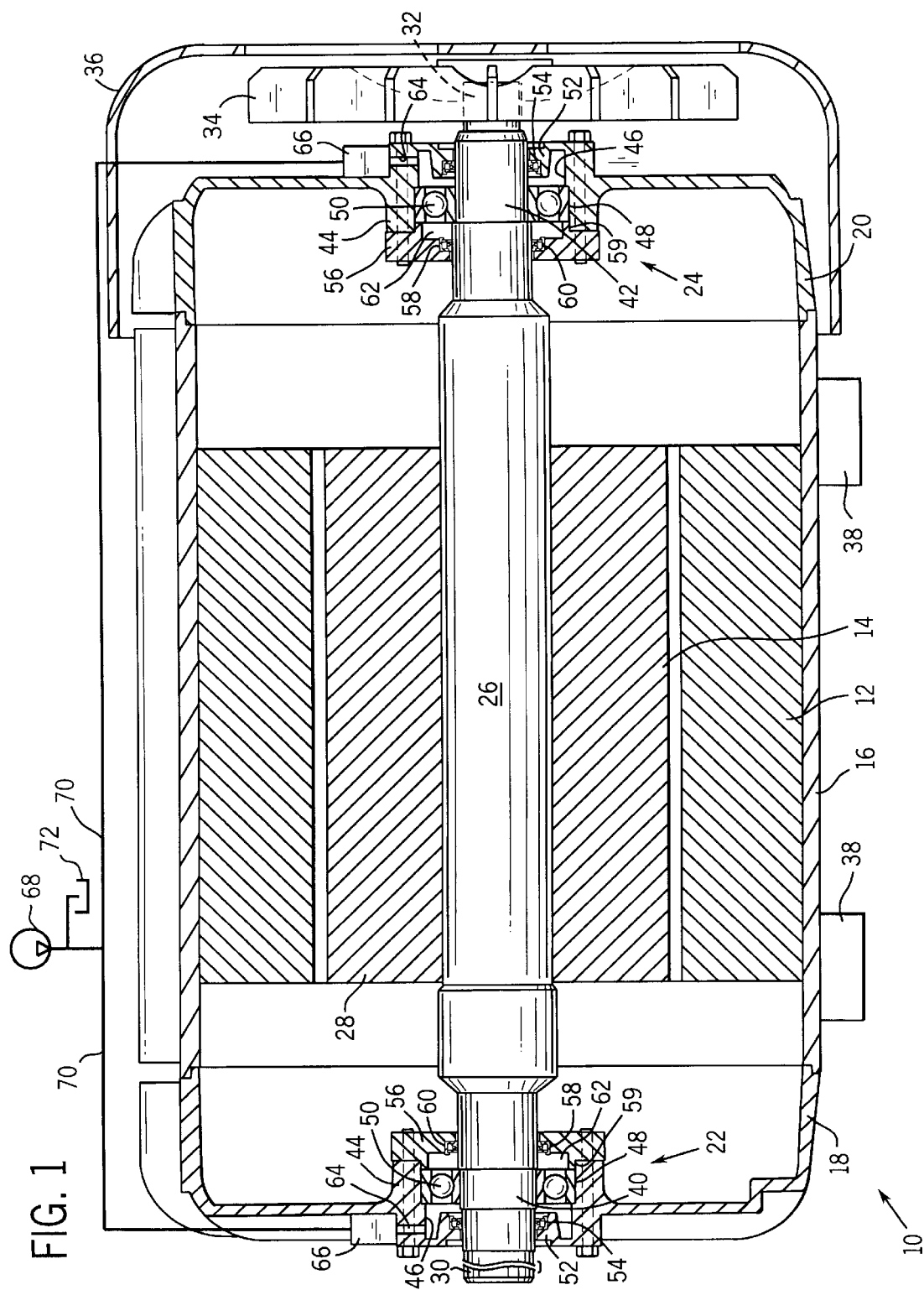
FIG. 1 is a diagrammatical sectional view of an electric motor including a pair of rotor support bearings and sealing arrangements for isolating internal cavities of the bearings from the internal regions of the motor and from ambient air by means of a pressurized lubricant system.

Turning now to the drawings, and referring first to FIG. 1, a diagrammatical sectional view of an electric motor is illustrated including sealing arrangements for a pair of bearing sets. The electric motor, designated generally by the reference numeral 10, includes a stator assembly 12 in which a rotor assembly 14 is rotatably positioned. Stator assembly 12 is lodged within a central housing section 16 of the electric motor in accordance with known techniques. Housing 16 is bounded by a front end bracket 18 and a rear end bracket 20. As will be appreciated by those skilled in the art, front and rear end brackets 18 and 20 provide support for a front bearing and seal assembly 22, and a rear bearing and seal assembly 24, respectively. Assemblies 22 and 24 will be described in greater detail below. It should be noted that details of the stator and rotor construction have not been represented in FIG. 1 for the sake of clarity.

In the embodiment illustrated in the Figures, motor 10 is a totally-enclosed, fan-cooled (TEFC) induction motor. As will be appreciated by those skilled in the art, stator assembly 12 in such motors includes stator windings disposed in a stator core and configured to receive input power from a source to drive rotor assembly 14 in rotation. Rotor assembly 14 includes a support and drive shaft 26 on which a rotor 28 is fixed. A drive or output end 30 of shaft 26 extends through front end bracket 18, while a rear or fan support end 32 of shaft 26 extends through rear end bracket 20. Drive end 30 will be configured with drive features (not shown) such as key ways, splines, and so forth, for transmitting mechanical power to a driven machine element coupled to motor 10. Fan support end 32 of shaft 26 is configured to receive a cooling fan 34 positioned generally parallel to rear end bracket 20. A vented fan cover 36 is secured to rear end bracket 20 around fan 34 to protect the fan from damage during transport and operation. In the illustrated embodiment, motor 10 includes support feet 38 for securing the motor to a mounting surface during installation.

It should be noted that the seal technique described herein is not limited to any particular form of electric motor. Accordingly, while a TEFC motor is illustrated and described herein, the sealing technique may be employed with other motor types, such as drip-proof motors, explosion-proof motors and so forth. Moreover, the technique may be adapted for motors having various mounting arrangements other than the foot-mounted model illustrated in the Figures. Such mounting arrangements may include brackets for supporting the motor by the front face or by flanges secured to the front or rear end bracket or to housing 16. Moreover, the sealing technique may be applied on motors other than induction motors. Accordingly, motor 10 may be mechanically and electrically configured as a single-phase or a polyphase machine, a synchronous motor, a direct current motor, and so forth.

Bearing and seal assemblies 22 and 24 are provided at support regions 40 and 42, respectively, of shaft 26 to support the shaft in rotation. To accommodate assemblies 22 and 24, front and rear end brackets 18 and 20 each include an integrally-formed support extension 44. In the illustrated embodiment, support extensions 44 are annular structures extending inwardly and forming central bores 46. Within bores 46, each support extension 44 forms a bearing support surface 48 for receiving an antifriction bearing set 50. Outboard of bearing support 48, each support extension 44 includes an annular outboard seal support 52. Supports 52 have central apertures coaxial with bores 46, permitting an end of shaft 26 to extend therethrough. Each seal support 52 is configured to receive an outboard seal assembly 54. Outboard seal assembly 54 contacts and rides against a portion of shaft 26 as described more fully below.

Support extension 44 is also formed to accommodate an inboard sealing arrangement. In particular, an annular internal cap 56 is positioned adjacent to an inboard face of each support extension 44. Internal caps 56 surround portions of shaft 26, and include annular seal supports 58, and alignment extensions 59 for engaging and maintaining axial and radial alignment of caps 56 with respect to support extensions 44. An inboard seal assembly 60 is positioned within each seal support 58. Like outboard seal assemblies 54, inboard seal assemblies 60 are also configured to ride against portions of shaft 26 during operation.

The foregoing structure is particularly well suited for use with a pressurized lubricating system which continuously circulates pressurized lubricant around and through bearing sets 50. In particular, support extension 44, internal cap 56, and outboard and inboard seal assemblies 54 and 60 define, with shaft 26, bearing cavities 62. Each bearing cavity 62 includes an annular space or region surrounding shaft 26 in which a bearing set 50 is positioned. To permit pressurized lubricant to be injected into the bearing cavities, front and rear end brackets 18 and 20 each include a lubricant port in fluid communication with the bearing cavity. Lubricant port 64 is threaded to receive a fluid reclassifier 66 illustrated diagrammatically in the Figures. As will be appreciated by those skilled in the art, reclassifier 66 is designed to receive a stream of pressurized air, and to atomize a liquid lubricant into the air stream for injection into the bearing cavities. Thus, as illustrated in FIG. 1, reclassifiers 66 are coupled to a source of pressurized, lubricated air 68 via fluid conduits 70. The source of pressurized air 68 will typically include an air compressor as well as any necessary filtering, pressure regulating and valving hardware (not illustrated). While various types of reclassifiers may be used for atomizing lubricant into the pressurized air stream, reclassifiers including one or more internal venturi devices have been shown to work well in this application. Moreover, while the reclassifiers may be provided at various locations along fluid conduits 70, these are preferably located closely adjacent to motor 10, preferably adjacent to end brackets 18 and 20.

The stream of pressurized air applied through reclassifiers 66 carries a fluid lubricant, such as high quality mineral or synthetic oil, drawn from a reservoir or source as indicated diagrammatically at reference numeral 72. The resulting streams of pressurized lubricant, typically in the form of a pressurized oil mist, are directed into reclassifiers 66 and thereby into bearing cavities 62 via lubricant ports 64. As described more fully below, the present sealing technique permits the pressure of the incoming lubricant stream to assist seal assemblies 54 and 60 in maintaining an appropriate seal around shaft 26 to isolate each bearing cavity 62. Moreover, the configuration of seal assemblies 54 and 60 reduces the flow of airborne lubricant from the bearing cavities escaping into the internal regions of the motor or into the surrounding atmosphere.

Figure 2:
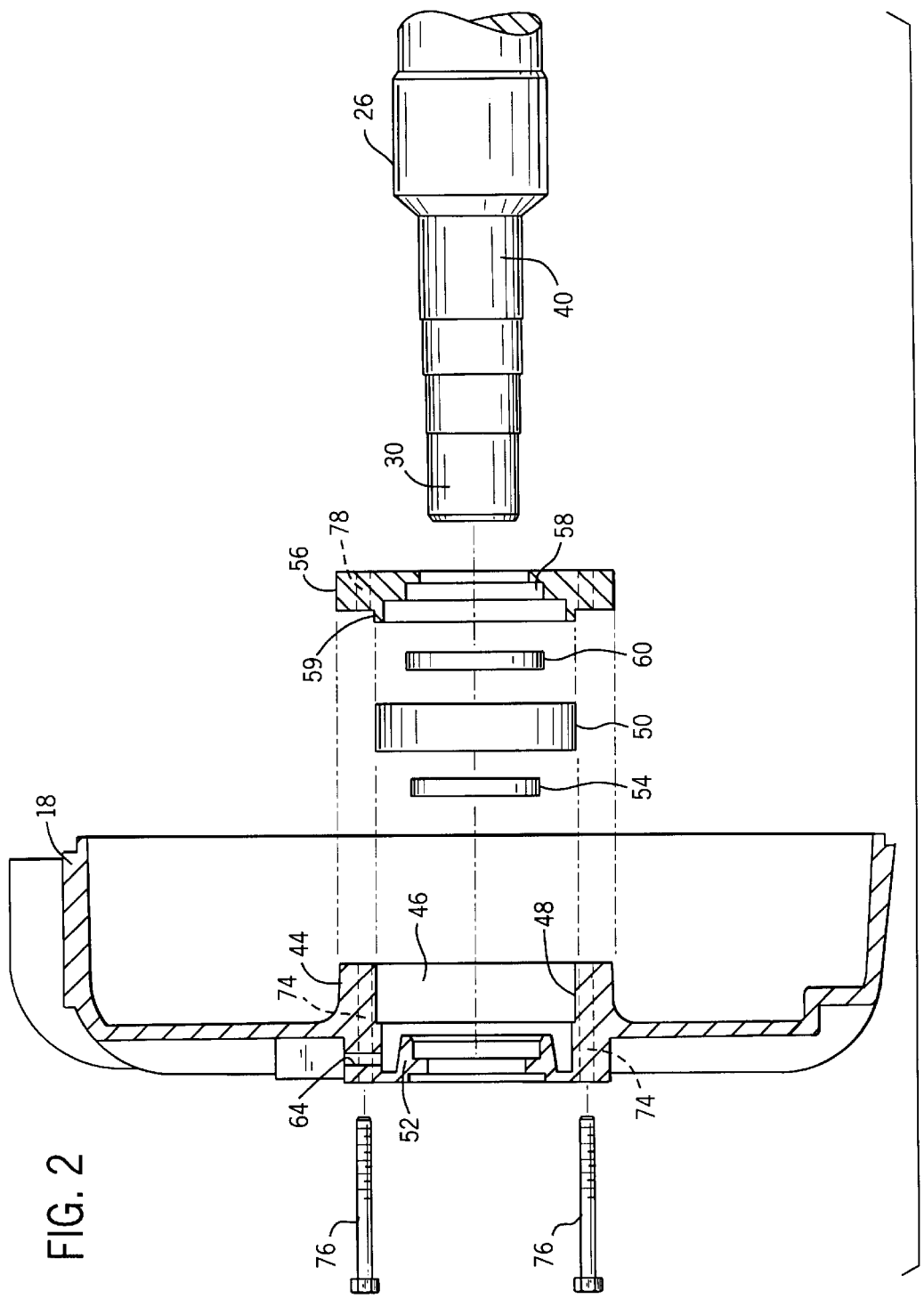
FIG. 2 is an exploded view of certain of the elements illustrated in FIG. 1 on one side of the electric motor illustrating a preferred configuration of the sealing arrangement for isolating the bearing and bearing cavity from the interior regions of the motor and from ambient air.
Figure 3:
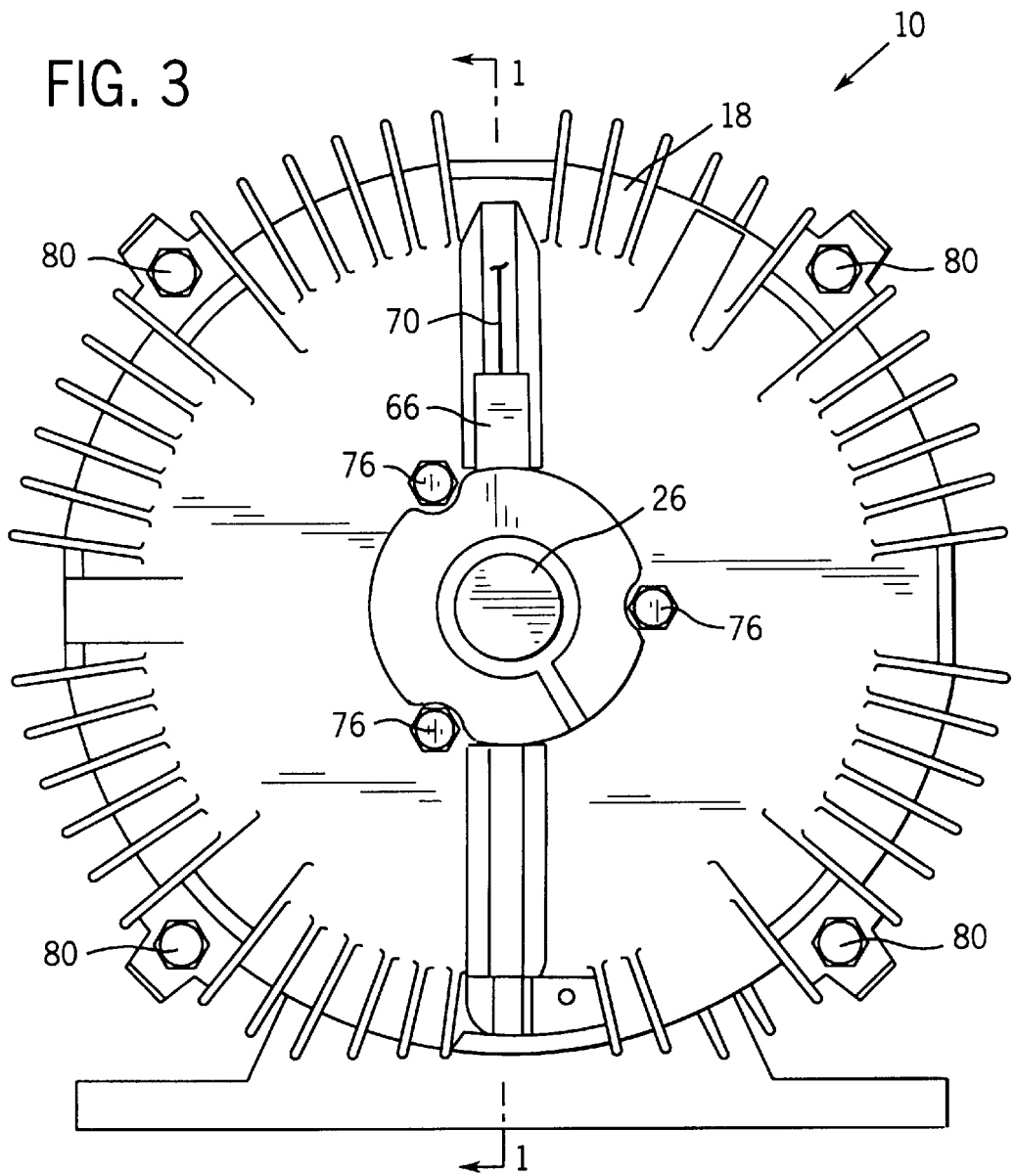
FIG. 3 is an elevational view of a bracket for supporting the bearing and sealing components illustrated in FIG. 2.

Referring more particularly now to a presently preferred arrangement for bearing and seal assemblies 22 and 24, FIG. 2 illustrates the components of bearing and seal assembly 22 prior to assembly. It will be noted that the components of bearing and seal assembly 24 are substantially identical to those described below with respect to assembly 22. As illustrated in FIG. 2, assembly 22 includes outboard seal assembly 54, bearing set 50, inboard seal assembly 60, and internal cap 56. Assembly 22 is installed by placing seal 60 within internal cap 56, and then by sliding internal cap 56 onto shaft 26 to support region 40. Bearing assembly 50 is then heated and fitted onto shaft 26 adjacent to internal cap 56. As bearing assembly 50 cools, it shrinks onto support region 40. The rotor, including shaft 26, internal cap 56, inboard seal assembly 60, and bearing 50, is then assembled in the motor housing (see FIG. 1). Outboard seal assembly 54 is then placed within seal support 52 of bracket 18. The bracket is placed on the motor housing (see FIG. 1) to complete assembly of the components surrounding the bearing cavity. To facilitate mounting of internal cap 56, fastener apertures 74 are formed through end bracket 18. Fasteners 76 are inserted through apertures 74 and are threadingly engaged within threaded bores 78 formed in internal cap 56, to secure internal cap 56 and the interposed elements in place on bracket 18. Aperture 74 and fastener 76 are preferably disposed in equal radial spacing about a central axis of the end bracket, as best illustrated in FIG. 3. Also as shown in FIG. 3, tie-rods or elongated bolts 80 are provided about an edge of each end bracket to secure the end brackets in place on either side of housing 16.

Figure 4:
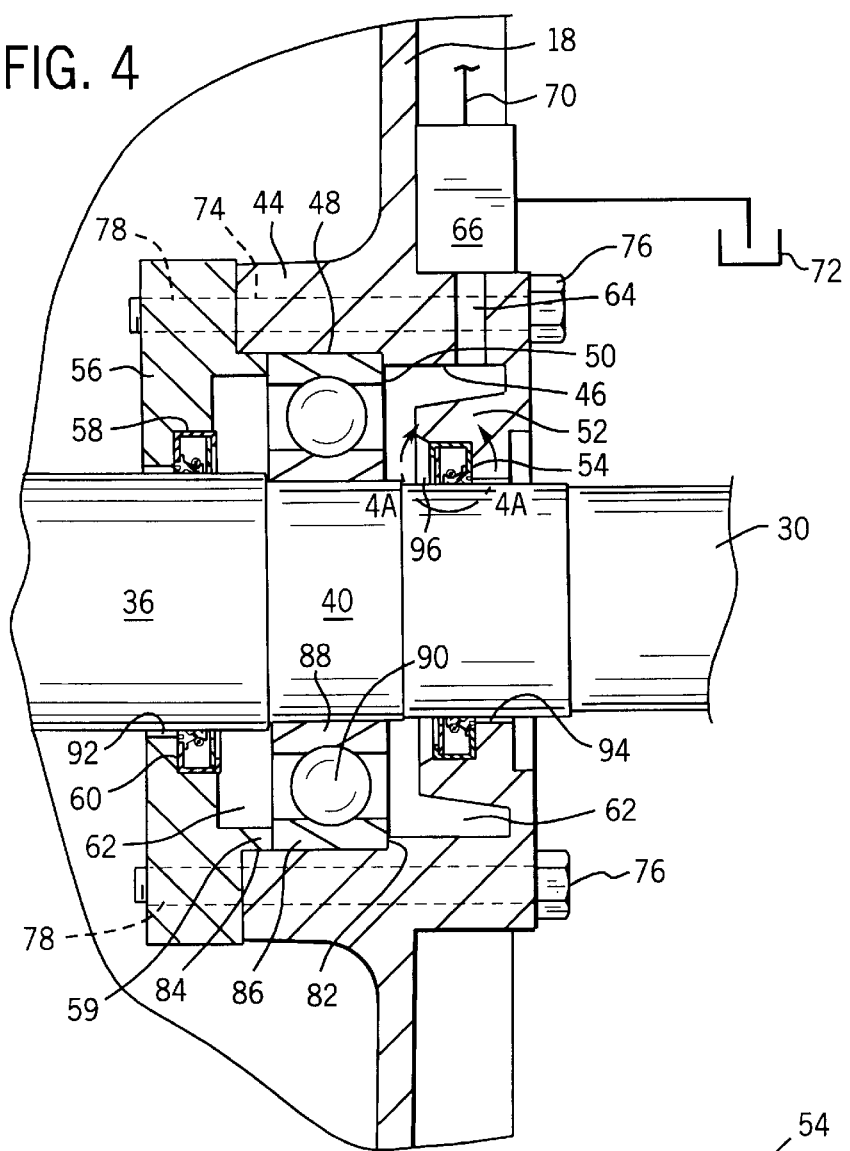
FIG. 4 is an assembled view of the elements illustrated in FIG. 2, showing the manner in which the seals and related components are supported in the support bracket.
Figure 4A:
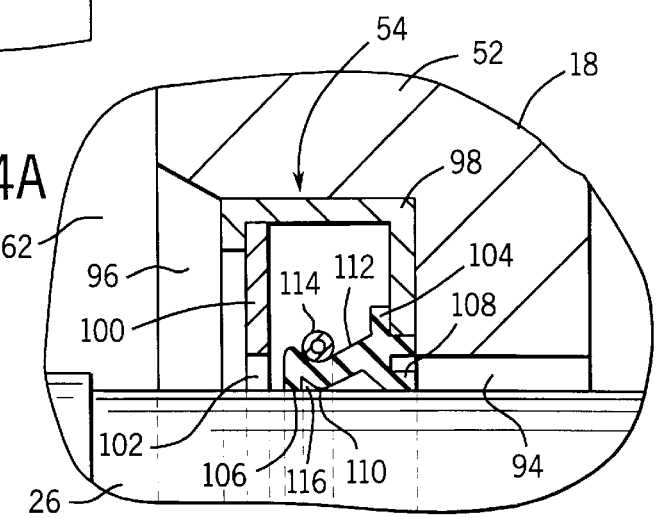
FIG. 4a is a detail view of the seal assembly shown in FIG. 4, illustrating in greater detail a preferred configuration for the sealing members in operation.

The foregoing structure is illustrated in greater detail in FIGS. 4 and 4A. As shown in FIG. 4, bearing support 48 is bounded by an annular shoulder 82 against which bearing set 50 is positioned during assembly. A retaining extension 84, surrounding extension 59, is formed on an outboard face of internal cap 56 to urge bearing set 50 into engagement against shoulder 82 and thereby to maintain bearing set 50 in a desired position within cavity 62. It should be noted that a space may be provided between retaining extension 84 and one of the bearing sets on one side of the motor to avoid preloading of the bearings during assembly and use. As will be appreciated by those skilled in the art, bearing set 50 will typically include an outer race 86, an inner race 88, and a plurality of antifriction bearing elements 90 disposed therebetween. Moreover, while ball bearing sets are illustrated in the Figures, those skilled in the art will appreciate that the bearing sets may include other configurations such as roller bearings, tapered roller bearings, needle bearings, journals, and so forth. Also, bearing set 50 may be secured within bearing support 48 and support region 40 of shaft 26 by close tolerances or interference fitting between these elements, or by shrink fitting, and so forth.

End bracket 18 and internal cap 56 are designed to establish a plurality of seals about shaft 26. Accordingly, a labyrinth seal is preferably established about shaft 26 by an inboard aperture 92 formed within internal cap 56. A similar labyrinth seal is formed by an outboard aperture 94 formed within seal support 54 of end bracket 18. In addition to these labyrinth seals, outboard and inboard seal assemblies 54 and 60 provide a riding a seal designed to contact and bear against shaft 26 during operation.

An advantageous configuration for seal assemblies 54 and 60 is illustrated in FIG. 4A for outboard seal assembly 54 mounted within front end bracket 18. As shown in FIG. 4A, seal assembly 54 is open to internal pressure within bearing cavity 62 by an open end 96 of seal support 52. In the embodiment illustrated in the Figures, seal assemblies 54 and 60 are preassembled multi-piece components which are inserted into the seal supports during assembly. Each seal assembly 54 and 60 includes an annular support 98 made of a rigid metal material, and an annular flange 100 secured to and partially enclosing a space within support 98. Annular flange 100 forms an opening 102 through which internal pressure within bearing cavity 62 may penetrate into the seal assembly.

An elastomeric sealing element 104 is secured to support 98 and is positioned to contact and ride against shaft 26 following installation. While the elastomeric sealing element 104 may assume a variety of configurations, in the illustrated embodiment, element 104 includes inboard and outboard lip portions 106 and 108, and an intermediate extension 110. Lip portions 106 and 108, and intermediate portion 110 serve to contact and compress element 104 against shaft 26. Elastomeric sealing element 104 further includes a pressure application surface 112 exposed to the elevated pressure within bearing cavity 62 during operation. In the illustrated embodiment, pressure application surface 112 is situated within annular support 98, and forms an elongated annular region against which the pressure of the lubricant stream is applied during operation. Differential pressure between pressure application surface 112 and the outboard side of elastomeric element 104 thus creates a sealing force which urges lips 106, 108 and intermediate portion 110 in contact about shaft 26. A biasing element 114, in the form of a helical spring, is received within elastomeric sealing element 104, to further urge the seal into engagement about shaft 26.

As will appreciated by those skilled in the art, the foregoing structure promotes sealing during operation, while reducing the tendency of airborne lubricant to exit the bearing cavities. In particular, because internal pressure within bearing cavities 62 urges elastomeric sealing elements 104 of each seal into contact with shaft 26, the sealing elements remain biased toward shaft 26, thereby containing the airborne lubricant within the bearing cavity. It should be noted that the pressure application surface 112 of each seal is oriented oppositely for the seal assemblies on either side of each bearing cavity. Specifically, pressure application surfaces 112 are oriented such that pressures of the lubricant stream above atmospheric pressure within each bearing cavity will continuously urge the elastomeric sealing elements into sealing positions, precluding the egress of airborne lubricants from the bearing cavities. Lubricant stream pressures on the order of 20 inches of water have been demonstrated to provide enhanced sealing forces for reduction of lubricant mist egress in TEFC motors.

The foregoing structure has also been demonstrated to improve the sealing performance of the oil mist lubricating system described. In particular, the orientation and configuration of the seals on either side of bearing cavities 62 has been demonstrated to improve the retention of liquid lubricant deposited from the airborne lubricant stream. This liquid lubricant forms a thin film between elastomeric elements 104 and shaft 26, as indicated by reference numeral 116 in FIG. 4A, to further restrict the egress of pressurized lubricant mist from the bearing cavities. Moreover, for large rotating shafts, the foregoing structure has been demonstrated to permit the shaft size to be significantly reduced while providing adequate lubrication for the seal. This reduction in shaft size is particular beneficial in large diameter shafts which could otherwise cause overheating and wear of the sealing elements or the shaft due to the high surface speeds.

While the invention may be susceptible to various modifications and alternative forms, specific embodiments have been shown in the drawings and have been described in detail herein by way of example only. However, it should be understood that the invention is not intended to be limited to the particular forms disclosed. Rather, the invention is to cover all modifications, equivalents, and alternatives falling within the spirit and scope of the invention as defined by the following appended claims. For example, while the foregoing structure has been described as providing for riding seals directly against shaft 26, the riding seals may be alternatively provided against a different rotating element, such as an element secured to shaft 26. Thus, the riding seals described above may be provided on collars, rings, and other mechanical elements designed to rotate with shaft 26.

What is claimed is:

1. A seal assembly for isolating a rotor bearing lubricated by a pressurized lubricating medium, the seal assembly isolating the bearing from an internal region of the motor or from an ambient region, the rotor bearing disposed between a stationary member and a rotating member, the pressurized lubricating medium being provided to the bearing at a first pressure higher than a second pressure present in the ambient region, the seal assembly comprising:

first and second sealing subassemblies disposed on either side of the bearing, each subassembly including a support portion adapted to be secured to the stationary member, each subassembly further including an opening for permitting the first pressure to penetrate into the respective support portion; and an elastomeric riding portion extending from the support portion toward the bearing, the riding portion being configured to ride against the rotating member during rotation of the rotating member and to apply a sealing force against the rotating member, the riding portion including a pressure application region configured to be exposed to the first pressure during operation, wherein the sealing force is produced at least partially from application of the first pressure against the pressure application region, the riding portion being configured to form and retain a thin lubricant film between the riding portion and the shaft during operation.

2. The seal assembly of claim 1, wherein the support portion of each subassembly includes a ring configured to be secured within a recess formed in the stationary member.

3. The seal assembly of claim 1, wherein the riding portion of each subassembly includes an elastomeric lip portion extending from the support portion and biased radially inwardly.

4. The seal assembly of claim 3, each subassembly further comprising a biasing member disposed adjacent to the riding portion to bias the riding portion radially inwardly.

5. The seal assembly of claim 4, wherein the sealing force is produced at least partially by the biasing member of each subassembly and by application of the first pressure against the pressure application region of each subassembly.

6. The seal assembly of claim 1, wherein for each subassembly a second region of the riding portion opposite the pressure application region is configured to be exposed to the second pressure during operation, and wherein the sealing force is produced at least partially by differential pressures applied to the pressure application region and to the second region.

7. A seal arrangement for an electric motor bearing, the electric motor including a stationary housing and a rotor rotatably supported within the housing by the bearing, the bearing being disposed in a bearing cavity defined at least partially by the housing and the rotor, the housing including a fluid path for continuously circulating a lubricant through the bearing cavity at an internal pressure higher than ambient pressure, the seal arrangement comprising:

a first seal having a first support portion and a first riding portion, the first support portion being supported in the housing, the first support portion including a first opening for permitting the internal pressure to be applied to the riding portion, the first riding portion extending from the first support portion and contacting a first region of the rotor and exerting a sealing force against the first region to seal the bearing cavity, the first riding portion being configured to form and retain a thin lubricant film between the first riding portion and the rotor during operation; and a second seal having a second support portion and a second riding portion, the second support portion being supported in the housing, the second support portion including a second opening for permitting the internal pressure to be applied to the riding portion, the second riding portion extending from the second support portion and contacting a second region of the rotor and exerting a sealing force against the second region to seal the bearing cavity, the second riding portion being configured to form and retain a thin lubricant film between the second riding portion and the rotor during operation;

wherein in operation the first and second riding portions are at least partially exposed to the internal pressure and the sealing force exerted by the first and second riding portions is at least partially produced by the internal pressure on the riding portions.

8. The seal arrangement of claim 7, wherein the rotor includes a rotor shaft and wherein the first and second regions extend along the rotor shaft.

9. The seal arrangement of claim 7, wherein the first and second riding portions are biased radially inwardly toward the rotor.

10. The seal arrangement of claim 9, wherein the first and second riding portions each include a biasing member which exerts a radially inward biasing force on the respective riding portion, and wherein the sealing force exerted by each riding portion is produced by the biasing force of the respective biasing member and by the internal pressure on the riding portion.

11. The seal assembly of claim 7, wherein a region of each riding portion is configured to be exposed to ambient pressure during operation, and wherein the sealing force exerted by each riding portion is produced at least partially by a pressure differential between the internal pressure and the ambient pressure on the riding portions.

12. A system for sealingly lubricating a bearing set in an electric motor, the system comprising:

a source of pressurized lubricant;

a bearing set disposed about a shaft of the electric motor within a bearing cavity, the cavity including inlet and outlet ports for receiving and transmitting the lubricant from the source;

a first seal assembly disposed on a first side of the bearing set for sealing the cavity at the first side, the first seal assembly including a first support portion and a first riding portion, the first support portion being supported on the first side of the bearing set and including a first opening for permitting the pressurized lubricant to penetrate into the first support portion, the first riding portion extending from the first support portion toward the bearing set, contacting a first region of the shaft and exerting a sealing force against the first region to seal the bearing cavity, the first riding portion being configured to form and retain a thin lubricant film between the shaft and the first riding portion during operation; and a second seal assembly disposed on a second side of the bearing set for sealing the cavity at the second side, the second seal assembly including a second support portion and a second riding portion, the second support portion being supported on the second side of the bearing set and including a second opening for permitting the pressurized lubricant to penetrate into the second support portion, the second riding portion extending from the second support portion toward the bearing set, contacting a second region of the rotor and exerting a sealing force against the second region to seal the bearing cavity, the second riding portion being configured to form and retain a thin lubricant film between the shaft and the second riding portion during operation;

wherein in operation the first and second riding portions are at least partially exposed to pressurized lubricant and the sealing force exerted by the first and second riding portions is at least partially produced by lubricant pressure on the riding portions.

13. The system of claim 12, wherein the first and second riding portions are biased radially inwardly toward the rotor.

14. The system of claim 12, wherein the first and second riding portions each include a biasing member which exerts a radially inward biasing force on the respective riding portion, and wherein sealing force exerted by each riding portion is produced by the biasing force of the respective biasing member and by the lubricant pressure on the riding portion.

15. The system of claim 12, wherein a region of each riding portion is configured to be exposed to ambient pressure during operation, and wherein sealing force exerted by each riding portion is produced at least partially by a pressure differential between the lubricant pressure and the ambient pressure on the riding portions.

* * * * *